US012698010B2

(12) United States Patent
Lim et al.

(10) Patent No.: US 12,698,010 B2
(45) Date of Patent: Aug. 4, 2026

(54) METHODS AND MOBILITY APPARATUS FOR PREDICTING AGENT BEHAVIOR FOR AUTONOMOUS DRIVING

(71) Applicants: Hyundai Motor Company, Seoul (KR); Kia Corporation, Seoul (KR); KOREA UNIVERSITY RESEARCH & BUSINESS FOUNDATION, Seoul (KR)

(72) Inventors: Hye Rin Lim, Hwaseong-Si (KR); Jin Kyu Kim, Seoul (KR); Seok Ha Moon, Seoul (KR); Sang Pil Kim, Seoul (KR)

(73) Assignees: Hyundai Motor Company, Seoul (KR); Kia Corporation, Seoul (KR); KOREA UNIVERSITY RESEARCH & BUSINESS FOUNDATION, Seoul (KR)

( * ) Notice: Subject to any disclaimer, the term of this patent is extended or adjusted under 35 U.S.C. 154(b) by 98 days.

(21) Appl. No.: 18/910,100

(22) Filed: Oct. 9, 2024

(65) Prior Publication Data

US 2025/0289478 A1 Sep. 18, 2025

(30) Foreign Application Priority Data

Mar. 12, 2024 (KR) ........................ 10-2024-0034457

(51) Int. Cl.
| | |
|---|---|
| *B60W 60/00* | (2020.01) |
| *G06F 40/30* | (2020.01) |
| *G06V 10/62* | (2022.01) |
| *G06V 10/82* | (2022.01) |
| *G06V 20/58* | (2022.01) |

(52) U.S. Cl.
CPC ....... *B60W 60/00274* (2020.02); *G06F 40/30* (2020.01); *G06V 10/62* (2022.01); *G06V*

*10/82* (2022.01); *G06V 20/58* (2022.01); *B60W 2420/403* (2013.01); *B60W 2554/402* (2020.02);

(Continued)

(58) Field of Classification Search
None
See application file for complete search history.

(56) References Cited

U.S. PATENT DOCUMENTS

| | | | |
|---|---|---|---|
| 2021/0276591 A1* | 9/2021 | Urtasun | ................ G01S 13/865 |
| 2024/0193793 A1* | 6/2024 | Li | ...................... G01C 21/3602 |

FOREIGN PATENT DOCUMENTS

WO WO-2025179785 A1 * 9/2025 ........ B60W 60/0027

* cited by examiner

*Primary Examiner* — Christian Chace
*Assistant Examiner* — Shayne M. Gilbertson
(74) *Attorney, Agent, or Firm* — Banner & Witcoff, Ltd.

(57) ABSTRACT

A method for controlling autonomous driving of a vehicle is introduced. The method involves generating, based on an image obtained from a sensor of a mobility device, a feature map and a feature of an object, generating an occupancy flow map feature of the object, wherein the occupancy flow map feature comprises local information associated with a predicted trajectory of the object in the feature map, wherein the feature of the object is fused with the feature map, and wherein the predicted trajectory is estimated from the feature of the object fused with the feature map, outputting a predicted path of the object from a feature of the object fused with the occupancy flow map feature, wherein the predicted trajectory is determined, based on a reliability of the predicted trajectory, as the predicted path, and controlling, based on the predicted path, autonomous driving of the vehicle.

20 Claims, 12 Drawing Sheets

(52) U.S. Cl.
  CPC . *B60W 2554/4045* (2020.02); *B60W 2556/35*
      (2020.02); *B60W 2556/40* (2020.02)

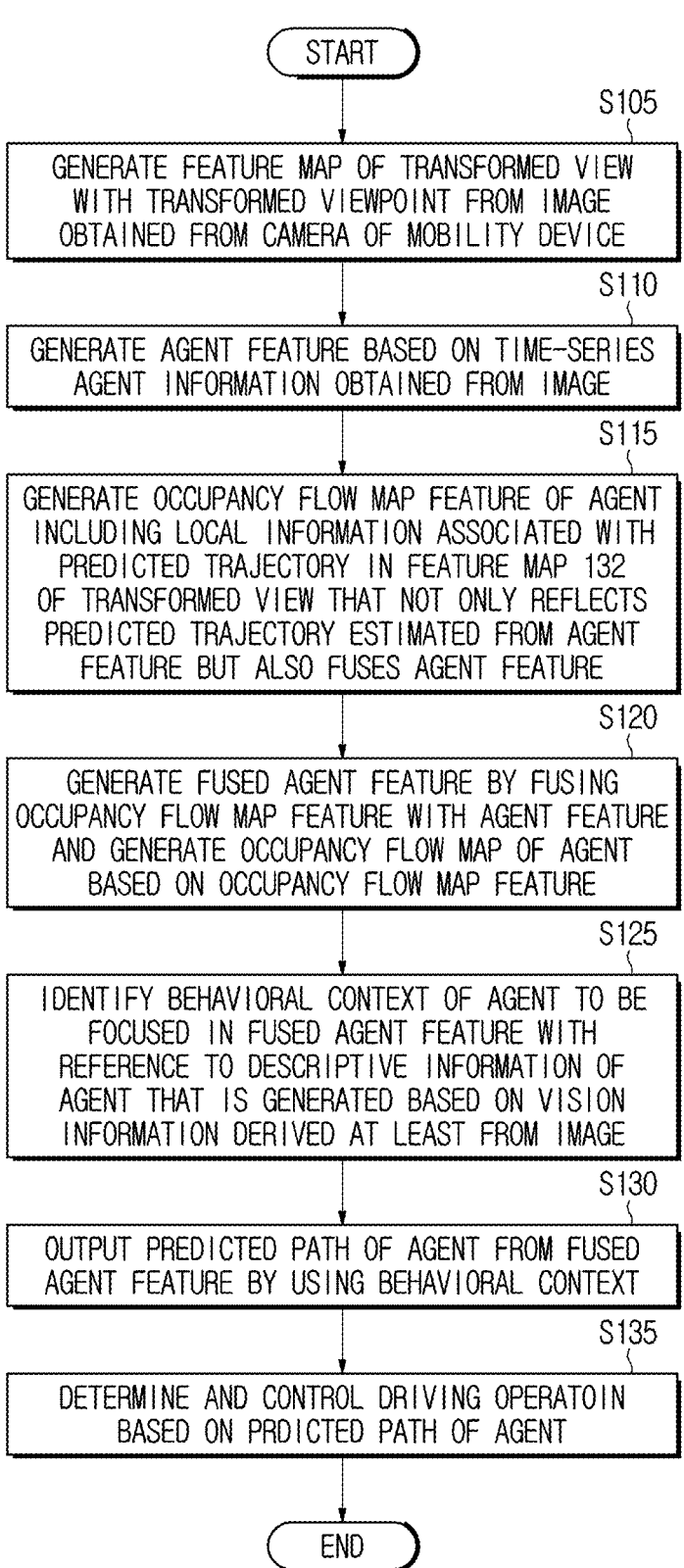

START

S105

GENERATE FEATURE MAP OF TRANSFORMED VIEW WITH TRANSFORMED VIEWPOINT FROM IMAGE OBTAINED FROM CAMERA OF MOBILITY DEVICE

S110

GENERATE AGENT FEATURE BASED ON TIME-SERIES AGENT INFORMATION OBTAINED FROM IMAGE

S115

GENERATE OCCUPANCY FLOW MAP FEATURE OF AGENT INCLUDING LOCAL INFORMATION ASSOCIATED WITH PREDICTED TRAJECTORY IN FEATURE MAP 132 OF TRANSFORMED VIEW THAT NOT ONLY REFLECTS PREDICTED TRAJECTORY ESTIMATED FROM AGENT FEATURE BUT ALSO FUSES AGENT FEATURE

S120

GENERATE FUSED AGENT FEATURE BY FUSING OCCUPANCY FLOW MAP FEATURE WITH AGENT FEATURE AND GENERATE OCCUPANCY FLOW MAP OF AGENT BASED ON OCCUPANCY FLOW MAP FEATURE

S125

IDENTIFY BEHAVIORAL CONTEXT OF AGENT TO BE FOCUSED IN FUSED AGENT FEATURE WITH REFERENCE TO DESCRIPTIVE INFORMATION OF AGENT THAT IS GENERATED BASED ON VISION INFORMATION DERIVED AT LEAST FROM IMAGE

S130

OUTPUT PREDICTED PATH OF AGENT FROM FUSED AGENT FEATURE BY USING BEHAVIORAL CONTEXT

S135

DETERMINE AND CONTROL DRIVING OPERATOIN BASED ON PRDICTED PATH OF AGENT

END

FIG. 4

*A white pickup truck is crossing the intersection, and is expected to continue straight.*

*pedestrian wearing a black t-shirt and shorts is crossing the street in the middle of the crosswalk, and is expected to continue straight.*

(a)

*A black SUV is stopped in the middle of the intersection due to a red traffic light, and is expected to remain stationary.*

*A pedestrian dressed in black is crossing the intersection from one side of the road to the other, and is expected to continue straight.*

(b)

METHODS AND MOBILITY APPARATUS FOR PREDICTING AGENT BEHAVIOR FOR AUTONOMOUS DRIVING

CROSS REFERENCE TO RELATED APPLICATION

The present application claims priority to Korean provisional patent application No. 10-2024-0034457, filed Mar. 12, 2024, the entire contents of which are incorporated herein for all purposes.

TECHNICAL FIELD

The present disclosure relates to a method and mobility device for predicting an agent behavior for autonomous driving, and more particularly, to a method and device for predicting a behavior of an agent, which predict the behavior of the agent based on image data of the agent obtained from a surrounding environment and text-based semantic information describing the agent thereby ensuring high prediction accuracy, speed of prediction, and reduced use of computing resource all together.

BACKGROUND

Commercial vehicles may be equipped with autonomous driving functions for driving convenience. Autonomous driving functions are being developed to realizing full autonomous driving where a vehicle has full control of driving without driver intervention in any situation. Before entering the full autonomous driving stage, some functions of full autonomous driving may be utilized by being mounted in commercial vehicles.

Autonomous driving may be capable of processing perception that detects a surrounding environment and estimates a location of a vehicle, decision that determines a driving operation based on a perceived environment and an estimated location, and control of an actuator according to a determined operation.

For an autonomous driving vehicle to run in a congested area, it may predict a next pose of an agent near the vehicle such as a neighbor vehicle and a pedestrian. A method mainly applied to this end may be predicting a behavioral situation or path of each agent based on past observation data of the agent and a high definition (HD) map. This method May use a high definition (HD) map, but HD maps may not be provided for every area. Some local areas lack HD maps. Because it may take a lot of human and computing resources to make a HD map for a wide area, there may be restrictions on providing a HD map for every area.

In view of the above, a method of predicting an agent without HD maps is being considered.

SUMMARY

According to the present disclosure, a method performed by a processor for controlling autonomous driving of a vehicle, the method comprising generating, based on an image obtained from a sensor of a mobility device, a feature map and a feature of an object, wherein the feature map is associated with a transformed view and a transformed viewpoint, generating an occupancy flow map feature of the object, wherein the occupancy flow map feature comprises local information associated with a predicted trajectory of the object in the feature map that reflects the predicted trajectory, wherein the feature of the object is fused with the feature map, and wherein the predicted trajectory is estimated from the feature of the object fused with the feature map, outputting a predicted path of the object from a feature of the object fused with the occupancy flow map feature, based on information, associated with a behavioral context of the object, derived from the image, wherein the predicted trajectory is determined, based on a reliability of the predicted trajectory, as the predicted path, and controlling, based on the predicted path, autonomous driving of the vehicle.

The method, wherein the generating the occupancy flow map feature comprises fusing the feature of the object with the feature map by cross attention to represent the predicted trajectory of the object in the feature map, wherein the cross attention uses the feature map with the predicted trajectory and the feature of the object, extracting, based on the predicted trajectory from the feature map, a local area, generating local information associated with the local area, and providing the occupancy flow map feature comprising the feature map fused with the feature of the object, and the local information.

The method, wherein the generating the local information comprises extracting occupancy areas occupied by the predicted trajectory from the feature map, predicting, based on the feature map, a trajectory of the object by identifying global interaction between the occupancy areas through self attention, and generating the local information by applying a convolution neural network (CNN) to the feature map for which the self attention is processed, wherein the local information comprises a feature of the local area associated with the predicted trajectory.

The method, wherein the feature of the object fused with the occupancy flow map feature is generated by deformable cross attention that uses the occupancy flow map feature and a feature of the object.

The method, wherein the feature of the object fused with the feature map of the transformed view is a feature of the object that is processed to reflect interaction of the object.

The method, further comprising, before the outputting the predicted path of the object, generating, based on vision information representing a situation in the image, text data by using an image language transform model, wherein the text data describes the predicted trajectory of the object and a situation of the object in text, encoding the text data, and generating information of the object that represents the behavioral context, wherein the behavioral context comprises the predicted trajectory and the situation of the object in text that matches the feature of the object, and wherein the situation of the object in text is matched with the feature of the object based on a contrastive learning model that uses the encoded text data and the feature of the object as processed in a common embedding space.

The method, wherein the generating the text data comprises refining, by a language refinement model and based on the vision information, the text data.

The method, wherein a learning model for implementing the method is trained by using a loss function that comprises a loss based on a similarity between the text data, wherein the text data describes the situation of the object in text and a situation feature of the object, a loss based on a trajectory of the object in the feature map, wherein the feature map is fused with the feature of the object, and a loss based on the predicted trajectory of the object.

The method, wherein the transformed view is a bird's eye view, and wherein the feature of the object is generated based on object information that has multi-modal data obtained from the image, the multi-modal data is heterogeneous data, and the feature of the object is generated by a transformer model and based on concatenated data that is combined by learning the multi-modal data.

The method, wherein the multi-modal data comprises a time-series trajectory of the object, a type of the object, and temporal change data of the object, wherein the temporal change data comprises a distance and a heading displacement from a perspective of the mobility device.

According to the present disclosure, an apparatus for controlling autonomous driving of a vehicle, the apparatus comprising a sensor configured to detect a surrounding environment of a mobility device, a memory configured to store at least one instruction, and a processor configured to execute the at least one instruction stored in the memory, wherein the processor is further configured to generate, based on an image obtained from the sensor, a feature map and a feature of an object, wherein the feature map is associated with a transformed view and a transformed viewpoint, generate an occupancy flow map feature of the object, wherein the occupancy flow map feature comprises local information associated with a predicted trajectory of the object in the feature map that reflects the predicted trajectory, wherein the feature of the object is fused with the feature map, and wherein the predicted trajectory is estimated from the feature of the object fused with the feature map, and output a predicted path of the object from a feature of the object fused with the occupancy flow map feature, based on information, associated with a behavioral context of the object derived from the image, wherein the predicted trajectory is determined, based on a reliability of the predicted trajectory, as the predicted path, and control, based on the predicted path, autonomous driving of the vehicle.

The apparatus, wherein the processor is further configured to generate the occupancy flow map feature by fusing the feature of the object with the feature map by cross attention represent the predicted trajectory of the object in the feature map, wherein the cross attention uses the feature map with the predicted trajectory and the feature of the object, extracting, based on the predicted trajectory from the feature map, a local area, generating local information associated with the local area, and providing the occupancy flow map feature comprising the feature map fused with the feature of the object, and the local information.

The apparatus, wherein the processor is further configured to generate the local information by extracting occupancy areas occupied by the predicted trajectory from the feature map, predicting, based on the feature map, a trajectory of the object by identifying global interaction between the occupancy areas through self attention, and generating the local information by applying a convolution neural network (CNN) to the feature map for which the self attention is processed, wherein the local information comprises a feature of the local area associated with the predicted trajectory.

The apparatus, wherein the feature of the object fused with the occupancy flow map feature is generated by deformable cross attention that uses the occupancy flow map feature and the feature of the object.

The apparatus, wherein the feature of the object fused with the feature map of the transformed view is a feature of the object that is processed to reflect interaction of the object.

The apparatus, wherein the processor is further configured to, before outputting the predicted path of the object, generate, based on vision information representing a situation in the image, text data by using an image language transform model, wherein the text data describes the predicted trajectory of the object and a situation of the object in text, encode the text data, and generate information of the object that represents the behavioral context, wherein the behavioral context comprises the predicted trajectory and the situation of the object in text that matches the feature of the object, and wherein the situation of the object in text is matched with the feature of the object based on a contrastive learning model that uses the encoded text data and the feature of the object as processed in a common embedding space.

The apparatus, wherein the processor is further configured to generate the text data by refining, by a language refinement model and based on the vision information, the text data. The apparatus, wherein a learning model is trained by using a loss function that comprises a loss based on a similarity between the text data, wherein the text data describes the situation of the object in text and a situation feature of the object, a loss based on a trajectory of the object in the feature map, wherein the feature map is fused with the feature of the object, and a loss based on the predicted trajectory of the object.

The apparatus, wherein the transformed view is a bird's eye view, and wherein the feature of the object is generated based on object information that has multi-modal data obtained from the image, the multi-modal data is heterogeneous data, and the feature of the object is generated by a transformer model and based on concatenated data that is combined by learning the multi-modal data.

The apparatus, wherein the multi-modal data comprises a time-series trajectory of the object, a type of the object, and temporal change data of the object, wherein the temporal change data comprises a distance and a heading displacement from a perspective of the mobility device.

BRIEF DESCRIPTION OF THE DRAWINGS

FIG. 4 shows an example of a flowchart of a method for predicting a behavior of an agent according to another example of the present disclosure.

DETAILED DESCRIPTION

Figure 1:
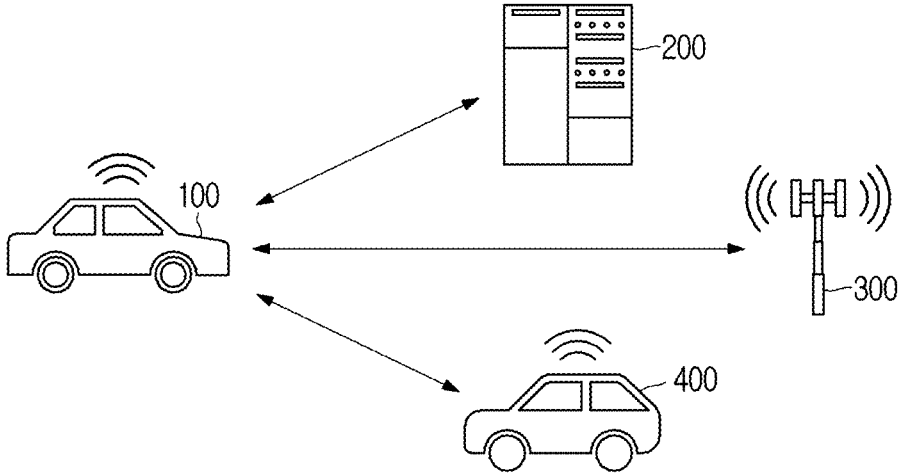
FIG. 1 shows an example of a mobility device communicating with another device to transmit and receive data.

Hereinafter, examples of the present disclosure are described in detail with reference to the accompanying drawings so that those having ordinary skill in the art may easily implement the present disclosure. However, examples of the present disclosure may be implemented in various different ways and thus the present disclosure is not limited to the examples described therein.

In describing examples of the present disclosure, some functions or constructions have not been described in detail since a detailed description thereof may have obscured the gist of the present disclosure. The same constituent elements in the drawings are denoted by the same reference numerals and a repeated or duplicative description of the same elements has been omitted.

In the present disclosure, if an element is simply referred to as being "connected to", "coupled to" or "linked to" another element, this may mean that an element is "directly connected to", "directly coupled to", or "directly linked to" another element or this may mean that an element is connected to, coupled to, or linked to another element with another element intervening therebetween. In addition, if an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically stated otherwise. Accordingly, a first element in an example could be termed a second element in another example, and, similarly, a second element in an example could be termed a first element in another example, without departing from the scope of the present disclosure.

In the present disclosure, elements are distinguished from each other for clearly describing each feature, but this does not necessarily mean that the elements are separated. In other words, a plurality of elements may be integrated in one hardware or software unit, or one element may be distributed and formed in a plurality of hardware or software units. Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in an example is also included in the scope of the present disclosure. In addition, examples including other elements in addition to the elements described in the various examples are also included in the scope of the present disclosure.

The advantages and features of the present disclosure and the ways of attaining them should become apparent to those of ordinary skill in the art with reference to examples of the present disclosure described below in detail in conjunction with the accompanying drawings. The examples of the present disclosure, however, may be embodied in many different forms and should not be constructed as being limited to the example examples set forth herein. Rather, the examples described herein are provided to make this disclosure more complete and to fully convey the scope of the present disclosure to those having ordinary skill in the art to which the present disclosure pertains.

In the present disclosure, each of phrases such as "A or B", "at least one of A and B", "at least one of A or B", "A, B or C", "at least one of A, B and C", and each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and if drawings illustrated in the present specification are inversed, the location relations described in the specification may be inversely understood. If a component, device, element, or the like of the present disclosure is described as having a purpose or performing an operation, function, or the like, the component, device, or element should be considered herein as being "configured to" meet that purpose or perform that operation or function.

Hereinafter will be described a mobility device for predicting a behavior of an agent (e.g., an object such as a neighbor vehicle, a pedestrian, an animal, a cyclist, etc.) for autonomous driving with reference to FIG. 1 and FIG. 2. FIG. 1 shows an example of a mobility device communicating with another device to transmit and receive data.

Referring to FIG. 1, a mobility device 100 may refer to a device that is capable of moving to a specific point. The mobility device 100 is a vehicle as a ground vehicle driven on the ground and may be a normal passenger vehicle or commercial vehicle, a purpose built vehicle (PBV), and the like. The mobility device 100 may be a four-wheel vehicle, for example, a sedan, a sports utility vehicle (SUV), and a pickup truck and may also be a vehicle with five or more wheels, for example, a bus, a lorry, a container truck, and a heavy vehicle. The mobility device 100 may be a device such as a mobile robot and a working robot for a specific purpose, which is controlled either autonomously or remotely.

In addition, the mobility device 100 is not limited to a ground mobility device and may be, for example, an aerial mobility device or a water mobility device for water transportation. An aerial mobility device may include a manned or unmanned flying object, and the unmanned flying object may be, for example, a drone, a personal aerial vehicle (PAV), or an urban air mobility (UAM). A water mobility device may be a ship or submarine that is operated manned or unmanned. In the present disclosure, the mobility device 100 is described, as an example, through a vehicle driven on the ground, but the present disclosure may be applied to a mobility device for aerial or water transportation.

The mobility device 100 may be driven by being controlled in autonomous driving, and the autonomous driving may be implemented as semi-autonomous driving or full autonomous driving. Full autonomous driving may be provided as autonomous moving under the complete control of a processor 120 of the mobility device 100 without a user's intervention even in an uncertain driving situation. Semi-autonomous driving may be provided as autonomous moving that requires a driver's intervention in a specific driving situation. When the driving situation occurs, semi-autonomous driving may be implemented such that the processor 120 disables autonomous driving and switches control to the user, and thus the user performs manual driving. According to the autonomous driving levels defined by the Society of Automotive Engineers (SAE), semi-autonomous driving may correspond to the autonomous driving levels 1 to 4, and full autonomous driving may correspond to the level 5.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

The mobility device 100 may be driven based on electric energy or fossil energy. In the case of electric energy, for example, the mobility device 100 may be a pure battery-based vehicle driven only by a high-voltage battery or employ a gas-based fuel cell as an energy source. In addition, the fuel cell may use various types of gas capable of generating electric energy, and for example, the gas may be hydrogen. However, without being limited thereto, various gases may be applicable. In the case of fossil energy, the mobility device 100 is driven based on fuels such as gasoline, diesel, or liquefied gas, and may be equipped with an engine that drives a wheel drive unit 114 by combustion of the fuel. The engine may be included in a power source unit 112 from a perspective of providing a driving torque of a wheel to the wheel drive unit 112. As another example, the mobility device 100 may be driven by a hybrid method of electric energy and fossil energy.

Meanwhile, the mobility device 100 may communicate with other devices 200 and 300 or another mobility device 400. For example, another device may include the server 200 for supporting various control, state management and driving of the mobility device 100, the ITS device 300 for receiving information from an intelligent transportation system (ITS), and various types of user devices. For example, the server 200 is an external device operated by a vehicle manufacturer or operated by a managing organization providing an autonomous driving service (e.g., an operation control for acceleration, deceleration, steering control, gear shifting control, braking system control, traction control, stability control, cruise control, lane keeping assist control, collision avoidance system control, emergency brake assistance control, traffic sign recognition control, adaptive headlight control, etc.) and may receive connected data of the mobility device 100 or transmit data for autonomous driving. In order to support autonomous driving and various services for the mobility device 100, the server 200 may transmit various types of information and software modules used for controlling the mobility device 100 to the mobility device 100 as a response to a request and data transmitted from the mobility device 100 and a user device.

For example, the ITS device 300 may be a road side unit (RSU), and the ITS device 300 may assist a user in driving his own car or support autonomous driving of the mobility device 100 by exchanging vehicle recognition data, driving control and situation data, environment data surrounding a vehicle, and map data through V2I with the mobility device 100. Through V2V with the another mobility device 400, the mobility device 100 may support a driver's driving his own car or autonomous driving by exchanging the above-listed data.

The mobility device 100 may communicate with another vehicle or another device based on cellular communication, wireless access in vehicular environment (WAVE) communication, dedicated short range communication (DSRC) or short range communication, or any other communication scheme.

For example, the mobility device 100 may use LTE as a cellular communication network, a communication network such as 5G, a WiFi communication network, a WAVE communication network, and the like to communicate with the server 200, the ITS device 300, and another mobility device 400. As another example, DSRC used in the mobility device 100 may be used for vehicle-to-vehicle communication. A communication scheme among the mobility device 100, the server 200, the ITS device 300, another mobility device 400, and a user device is not limited to the above-described example.

Figure 2:
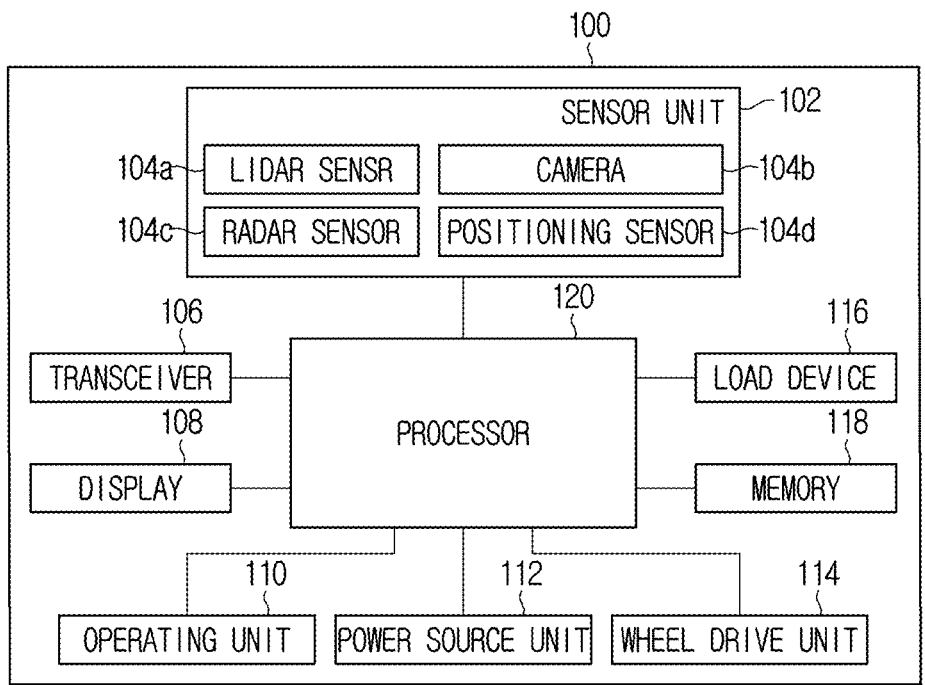
FIG. 2 shows an example of constituent modules of a mobility device according to an example of the present disclosure.

FIG. 2 shows an example of constituent modules of a vehicle according to an example of the present disclosure.

The mobility device 100 may include a sensor unit 102 (e.g., camera, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, etc.), a transceiver 106, and a display 108.

The sensor unit 102 may be equipped with various types of detectors for sensing various states and situations occurring in external and internal environments of the mobility device 100 and for identifying location information of the mobility device 100. That is, the sensor unit 102 may be configured as a multiple sensor module including heterogeneous sensors to obtain sensing data detected from each of the sensors.

Specifically, the sensor unit 102 may be equipped with a camera 104b and a radar sensor 104c for recognizing dynamic and static objects present around the mobility device 100 and have a positioning sensor 104d capable of obtaining location information of a vehicle. The sensor unit 102 may obtain sensor data including three-dimensional recognition data, perception/observation data, and positioning information by the above-described sensors.

The Lidar sensor 104a may be a sensor that observes a surrounding environment based on laser scanning and perceives a three-dimensional shape of an object.

The camera 104b may obtain two-dimensional (2D) image data or image data with depth information for an environment and an object around the mobility device 100. As the camera 104b is installed in a plurality of portions of the mobility device 100, a plurality of images or a multi-view may be obtained for a surrounding environment of the mobility device 100. Each image may be a view that is taken according to a position and a pose of the camera 104b in the mobility device 100. Each image may be processed by being recognized as an ego-centric spatial system/coordinate system.

For example, the radar sensor 104c may irradiate an electromagnetic wave with a predetermined wavelength and thus detect a behavior of an object based on an electromagnetic wave reflected from the object. For example, the behavior of an object may include the presence of the object, whether the object moves, a distance between the mobility device 100 and the object, a speed of the object, and a movement direction.

Apart from the positioning sensor 104d, the sensor unit 102 may be equipped with a gyro sensor, an acceleration sensor, a wheel sensor, an autometer, a speed sensor and the like, in order to identify its own location, driving position, and speed. In addition, to monitor a user inside the mobility device 100, a condition of an occupant, and an operating situation of an internal device of the mobility device 100 that a user is capable of maneuvering, the sensor unit 102 may have an inward-facing image sensor, a biosensor for detecting biosignals of a driver and an occupant, and various detection modules for detecting the operation and state of an internal device.

The present disclosure mainly describes sensors of the sensor unit 102 referred to for description of an example but may further include a sensor for detecting various situations not listed herein.

The transceiver 106 may support mutual communication with the server 200, the ITS device 300, and the neighbor mobility device 400. In the present disclosure, the transceiver 106 may transmit data generated or stored during driving to the server 200 and receive data and a software module transmitted from the server 200. In the present disclosure, the mobility device 100 may transmit and receive data used in the method according to the present disclosure to and from the outside through the transceiver 106.

The display 108 may serve as a user interface. By the processor 120, the display 108 may display an operating state and a control state of the mobility device 100, path/traffic information, information on an energy remaining quantity, a content requested by a driver, and the like to be output. The display 108 may be configured as a touch screen capable of sensing a driver input and receive a request of a driver indicated to the processor 120.

A user may activate or deactivate an autonomous driving function through a soft-type interface like a touch of the display 108 or a hard-type interface provided in a predetermined position inside the mobility device 100. In the case of a hard-type interface, for example, a button or key for an autonomous driving function may be installed on a steering wheel, a dashboard, and the like. In addition, the interfaces may be configured to provide detailed options for selecting various functions provided at a corresponding level of autonomous driving.

Meanwhile, the mobility device 100 may include an operating unit 110, the power source unit 112, the wheel drive unit 114, and a load device 116.

The operating unit 110 may be equipped with at least one module for implementing a driving operation and perform at least one driving operation of longitudinal control like acceleration/deceleration and transverse control like steering. The operating unit 110 may be equipped with not only a pedal and a steering wheel accepting a user's request for the control but also various operating modules for generating a driving operation according to the request in the wheel drive unit 114.

The power source unit 112 may generate and supply power and electricity used for a driving power system like the wheel drive unit 114 and the load device 116. In case the mobility device 100 is driven based on electric energy, for example, the power source unit may be configured as an electric battery or be configured as a combination of an electric battery and a fuel cell for charging the battery. In the case of a combination of an electric battery and a fuel cell, the power source unit 112 may include a tank for storing a material used to produce power of the fuel cell, for example, hydrogen gas. In case the mobility device 100 is driven based on fossil energy, the power source unit 112 may be configured as an internal combustion engine.

The wheel drive unit 114 may include a plurality of wheels, a driving force transfer module for generating and giving a driving force to wheels or for transferring a driving force, a braking module for decelerating the driving of wheels, and a steering module for realizing transverse control of wheels. In case the mobility device 100 is driven based on electric energy, a driving force transfer module may be configured as a motor module that generates a driving force based on electric power output from an electric battery. In case the mobility device 100 is operated based on fossil energy, a driving force transfer module may be equipped with transmission and a gear module that transfer power of an internal combustion engine.

In the present disclosure, the operating unit 110 and the wheel drive unit 114 may constitute an actuating unit which transfers power generated from the power source unit 112 and externally implements a driving operation and a pose. In the present disclosure, the actuating unit is referred to as an actuator, and these terms may be used interchangeably.

The load device 116 may be an auxiliary equipment mounted on the mobility device 100, which consumes power supplied from the power source unit 112 by use of an occupant or user or converted from output of the power source unit 112. In the present disclosure, the load device 116 may be a type of electric device for non-driving purpose excluding a driving power system like the wheel drive unit 114. For example, the load device 114 may be various devices installed in an air-conditioning system, a light system, a seat system and the mobility device 100.

In addition, the mobility device 100 may include a memory 118 and the processor 120.

The memory 118 may store an application for controlling the mobility device 100 and various data and load the application or read and record data at a request of the processor 120. In the present disclosure, the memory 118 may hold a model or a network, which is trained to predict an expected path of an agent based on high-level semantic information on the agent in an image and a surrounding image obtained from a sensor of the mobility device 100, for example, from a plurality of cameras 104b and store an application and at least instruction for implementing the model.

An agent may mean an object near the mobility device 100. An object may include a dynamic object and a static object. A dynamic object is an object with mobility and may represent a path or a trajectory according to movement. In the present disclosure, an agent may be a dynamic object in a narrow sense and may be a personal mobility device such as a vehicle, a bicycle, and an electronic scooter, a robot, a pedestrian, a facility with mobility, or any other mobile means.

A static object may be a fixed object that has no movement over time. For example, the static object may be a road object on a road, where the mobility device 100 runs, and a road side object. For example, a static road object may include a road surface, a road structure, notice information for traffic control such as a lane and a traffic mark, an infrastructure device for traffic control, a sign post installed on a road, a traffic sign, a road boundary object, and the like. For example, a road structure is a structure of a road, where the mobility device 100 and an agent move, and may include an intersection, a rotary road, a road direction, and a parking area. For example, a traffic mark may be a driving direction line, a crosswalk, a speed limit, and a U-turn, and an infrastructure device may be a traffic light, a facility also serving as lane, an enforcement equipment for monitoring violation of traffic regulations, and various information devices for traffic flow control. A road boundary object may be a boundary object between a road, where the mobility device 100 runs, and a non-driving zone where the device cannot run. For example, a non-driving zone may be a sidewalk, a no-vehicle zone like sidewalk, and a vehicle access zone. A road boundary object may be implemented by a curb, a guardrail, a boundary stone, a boundary block structure, a shock absorbing structure, and a rail for road. A road side object may be a building, a sidewalk, a roadside tree, and any other fixed facility.

Meanwhile, the memory 118 may store and manage map information. Map information may be used to generate a driving path set to the mobility device 100 at a request of a user or the processor 120. In addition, the map information may be used for autonomous driving and include a low definition map or include an HD map together with the map. Map information may be provided to have various information and data included in the above-described object and environment. The HD map may include various road data necessary for autonomous driving, which includes, for example, lanes (e.g., a number and orientation of lanes), traffic lights (e.g., location and status of traffic lights), signs (e.g., location and status of road signs), road conditions (e.g., potholes, bumps, road texture), traffic flow (e.g., traffic density, speeds, patterns), obstacles and hazard information (e.g., construction zones, debris, pedestrians), location of crosswalks and pedestrian paths, layouts of intersections, and roadside features (e.g., barriers, guardrails, sidewalks, edges). According to an example of the present disclosure, if there is no HD map or if the mobility device 100 runs in an area for which no HD map is provided, a predicted path of an agent may be generated without HD map based on an image and descriptive information, a driving operation of the mobility device 100 may be determined based on the predicted path, and an actuator may be controlled according to the operation.

The processor 120 may perform overall control of the mobility device 100. The processor 120 may be configured to execute an application and an instruction stored in the memory 118. Specifically, the processor 120 may generate a predicted path by using a learning model, which predicts a behavior of an agent stored in the memory 118, and control autonomous driving of the mobility device 100 according to the predicted path. The processor 120 may activate autonomous driving in response to an autonomous driving request by a user or a setting of the mobility device 100 itself and control the mobility device 100 to activate autonomous driving at a level applied to the mobility device 100. In addition, the processor 120 may deactivate autonomous driving by a user's release or at a request according to automatic release and control the mobility device 100 to be manually driven.

In relation to the present disclosure, by using an application, an instruction and data stored in the memory 118, the processor 120 may generate a feature map of a transformed view with a changed viewpoint and an agent feature based on an image obtained from a sensor of the mobility device. The processor 120 may generate an occupancy flow map feature of an agent including local information associated with a predicted trajectory in a feature map of a transformed view that not only reflects the predicted trajectory estimated from an agent feature but also fuses the agent feature. In addition, based on a behavioral context of the agent attended to by descriptive information of the agent derived in relation to an image, the processor 120 may implement processing of outputting a predicted path of the agent from a fused agent feature that fuses the occupancy flow map feature with the agent feature. The descriptive information of the agent may be high-level semantic information that textually describes a situation and a trajectory of the agent.

In the present disclosure, as an example, the processor 120 may be implemented as a single processing module. As another example, processing according to the above description may be performed as distributed processing in a plurality of processing modules, and the processor 120 in the present disclosure may collectively refer to the plurality of processing modules.

Figure 3:
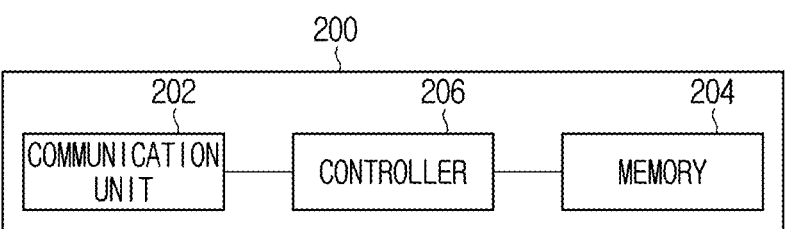
FIG. 3 shows an example of constituent modules of a server according to the present disclosure.

FIG. 3 shows an example of constituent modules of a server according to the present disclosure.

The server 200 may include a communication unit 202, a storage unit 204, and a controller 206. The communication unit 202 may exchange data and signals with the mobility device 100, the ITS device 300, and another mobility device 400.

The storage unit 204 may store a program for controlling the server 200 and various data and load the program or read and record data at a request of the controller 206. The storage unit 204 may manage a learning model for predicting a behavior of an agent and a learning model for learning of the model. A learning model may include all of a plurality of functional modules illustrated in FIG. 5 to be described below. Learning data may include images collected from the plurality of mobility devices 100 and 400, descriptive information of an agent, a predicted path of the agent, and an actual path of the agent. Apart from the above-described data, the storage unit 204 may have an application for implementing driving and convenience functions of the mobility device 100, map information, traffic information, weather information, and various information affecting the driving.

The controller 206 may perform overall control of the server 200. The processor 120 may be configured to execute an application and an instruction stored in the storage unit 204. Specifically, by using the above-described learning data, the processor 120 may control the server 200 to train a learning model held in the storage unit 204 and distribute the trained learning model to the mobility device 100. Through training, the controller 206 may determine a functional module of FIG. 5, which constitutes a learning module, that is, a learnable parameter for constructing a lower model. In addition, the controller 206 may receive feedback information according to an operation of a learning model in the mobility devices 100 and 400 and data of a same type as the above-described data from the mobility devices 100 and 400 and then update the learning model based on the received information and data. The controller 206 may distribute the updated learning model to the mobility devices 100 and 400. In addition, the controller 206 may support the driving and convenience functions of the mobility device 100. In the present disclosure, like the processor 120, the controller 206 may be configured as a single processing module or a plurality of processing modules.

Hereinafter, a method for predicting a behavior of an agent for autonomous driving according to an example of the present disclosure will be described in detail through FIG. 4 to FIG. 11A and FIG. 11B.

Figure 5:
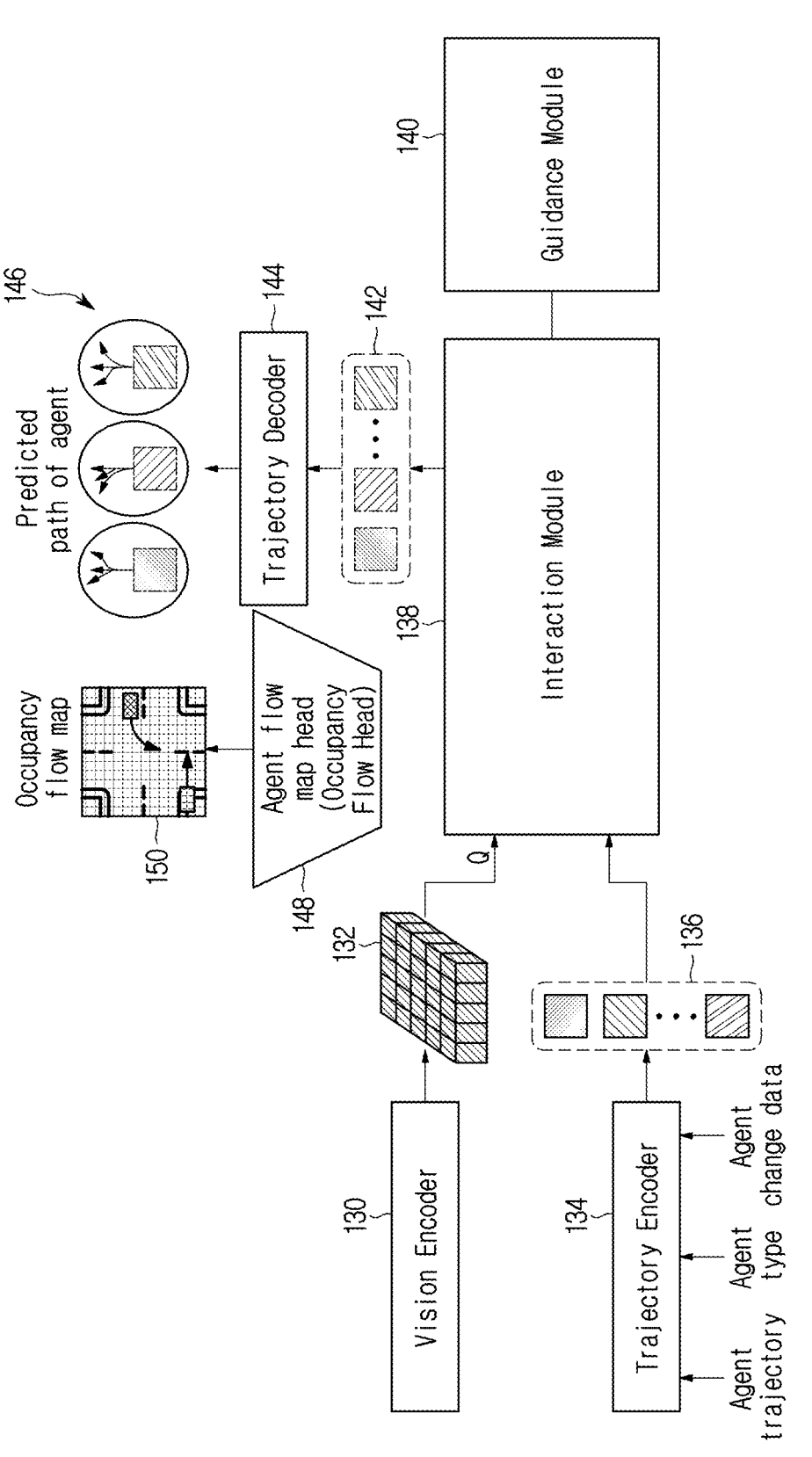
FIG. 5 shows an example of a module-based implementation of a method for predicting a behavior of an agent according to another example of the present disclosure.

FIG. 4 shows an example of a flowchart of a method for predicting a behavior of an agent according to another example of the present disclosure. FIG. 5 shows an example of a module-based implementation of a method for predicting a behavior of an agent according to another example of the present disclosure. In FIG. 5, a module for implementing the method for predicting a behavior may be a software module processed by the processor 120, and the processor 120 may process requests from the modules listed in FIG. 5.

In the present disclosure, a learning model for predicting a behavior of an agent is described to be operated as an embedded component of the mobility device 100, but a method for predicting a behavior, which will be described below, may be processed by being distributed across the mobility device 100 and the server 200 without departing from the scope of the below description. In addition, in the present disclosure, a ground mobility device 100 is described as an example, but the below method for predicting a behavior is certainly applicable to mobility devices for aerial or underwater transportation. Hereinafter, for convenience of explanation, the processor 120 of the mobility device 100 will be abbreviated to the mobility device 100, or these terms may be used interchangeably.

Referring to FIG. 4 and FIG. 5, while being used by a user, the mobility device 100 may obtain a surrounding image from the camera 104b, and the processor 120 of the mobility device 100 may generate a feature map of a transformed view 132 with a transformed viewpoint from the image of the camera 104b (S105).

The image may be obtained from the multi-camera 104b and be a multi-view including dynamic objects and static objects around the mobility device 100. Herein, at least some of the dynamic objects may be agents, as described above. The multi-view may be an image that is obtained in a taking direction according to a position of installation and a pose of each camera. The multi-view may be an ego-centric image and an image with a vanishing point. A transformed view with a viewpoint transformed from the image may be, for example, a bird's eye view. A bird-eye view may be a view taken above a certain distance from a ground and/or an object and may capture an area larger than a threshold (e.g., a threshold area configured in memory of the aerial vehicle). A bird-eye view image may indicate (and/or may be associated with) a perspective angle from the aerial vehicle (e.g., row, yaw, pitch information of the aerial vehicle and/or one or more cameras of the aerial vehicle). A bird-eye view image may indicate (and/or may be associated with) time information and/or other indicators of a frame of the bird-eye view image. A bird-eye view image may indicate (and/or may be associated with) one or more landmark images included in the bird-eye view image.

Figure 6:
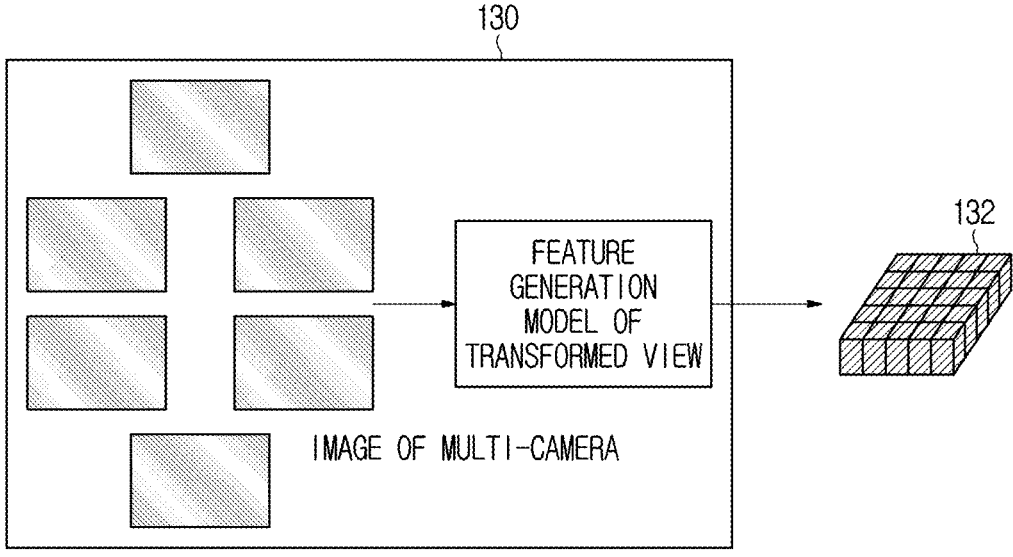
FIG. 6 shows an example of a processing process of a vision encoder.

The feature map of the transformed view 132 may be generated by the vision encoder 130, and generation of a feature map will be described with reference to FIG. 6. FIG. 6 shows an example of a processing process of a vision encoder.

First, the vision encoder 130 may project a feature in an image of multi-view collected in real time as a feature of transformed view by using a feature generation model of a transformed view. The transformed view is exemplified as a bird's eye view but is not limited thereto and may be a transformed view of any type with a transformed viewpoint from the image of multi-view. Hereinafter, for convenience of explanation, the terms 'transformed view' and 'bird's eye view' will be used interchangeably. The above projection may be processed by using, for example, a BEVDepth model (or BEVDepth network). A feature generation model of the transformed view has a network for adjusting a receptive field, and the feature generation model may generate the feature map of the transformed view 132 by encoding map data associated with a feature of the transformed view. Specifically, the network may consist of a ResNet and a feature pyramid network, which are convolution neural networks (CNNs). Features of a transformed view are combined through concatenation, and the feature map of the transformed view 132 may be generated if concatenated features are provided to a CNN. The feature map of the transformed view 132 may be used to consider interaction between an agent and an environmental factor. The environmental factor may be a dynamic object and a static object around the agent.

Next, the processor 120 may generate an agent feature 136 based on time-series agent information that is obtained from the image (S110).

The agent feature 136 may be generated based on agent information that has multi-modal data of each agent obtained from the image. The image may be received from the camera 104b of the mobility device 100 or another device such as the mobility device 400 and the ITS device 300. The multi-modal data is heterogeneous data, and the agent feature 136 may be generated by a transformer model based on concatenated data that is combined by learning the multi-modal data.

Figure 7:
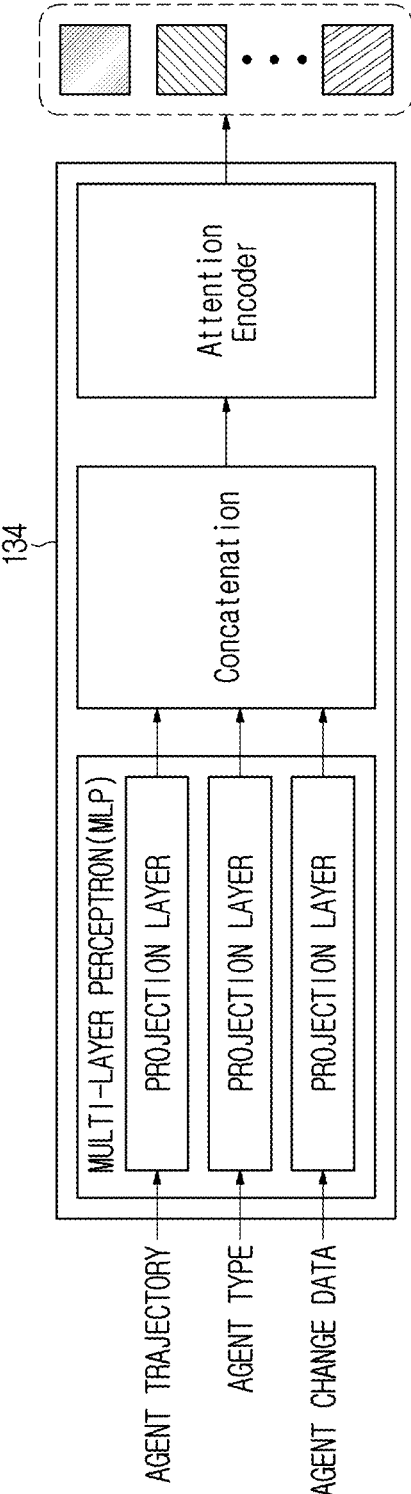
FIG. 7 shows an example of a processing process of a trajectory encoder.

An agent feature is generated by a trajectory encoder 134, and generation of an agent feature will be described through FIG. 7. FIG. 7 shows an example of a processing process of a trajectory encoder.

Referring to FIG. 7, the trajectory encoder 134 may be configured as a model including a multi-layer perceptron (MLP), a connected layer, and an attention encoder.

The multi-layer perceptron may receive multi-modal data from each agent and extract a feature of each multi-modal data according to each agent through a projection layer of the multi-layer perceptron corresponding to each data. Multi-modal data constituting agent information may be produced through image analysis of the processor 120. For example, multi-modal data may include a time-series trajectory of an agent, a type of the agent, and temporal change data of the agent that includes a distance and a heading displacement from the perspective of the mobility device. The time-series trajectory may be a past path of the agent that is identified from a series of images according to time or each time step. The type of the agent is intrinsic information specifying an object of the agent and may be represented by, for example, a vehicle, a pedestrian, a bicycle, a personal mobility device, and the like. The change data of the agent may include a distance and a heading vector of the agent that are identified from a series of images according to time or each time step. The distance of the agent may be a distance or a position from the mobility device 100 equipped with the camera 104$b$ to the agent. The heading vector is a vector representing a moving direction of the agent and may be a vector that is set in a spatial system (or coordinate system) centered on the mobility device 100.

Features of each multi-modal data are concatenated with each other according to each agent, and thus a combined feature of each agent may be generated. The attention encoder is a type of a transformer model and may generate the agent feature 136 based on a combined feature of each agent. The agent feature 136 may be generated as a transformer model fuses time-series agent information with each agent. The agent feature 136 may have a number N of agents and an embedding dimension D according to multi-modal data.

As for detailed description of a processing process of the trajectory encoder 134, in order to obtain time-series agent information on movement of each agent, displacement $$\Delta P_i^t$$

may be used at each time step t, which is expressed by $$(P_i^t - P_i^{t-1}).$$

Here, i may denote an agent, and t may represent time. In case no detection occurs before a time step T, $$\Delta P_i^t$$

may be set to 0. In addition, a temporal attention block may be used to extract an overall operation of each agent before a current time $T_{curr}$. In order to store a temporal context for movement of an agent, a learnable query called "agent token" may be used according to approach of natural language processing. Consequently, inputs for the temporal attention block may be the displacement $$\Delta P_i^t$$

at each time step, type embedding $E_{type}$ representing an agent type, embedding of time (or change data) $E_{temp}^t$ including temporal information, and an agent token $\eta$ capturing a whole context. The related formulas may be expressed as Formula 1 and Formula 2.

$$f_i^t = \sigma_P(\Delta P_i^t) + E_{type} + E_{temp}^t \qquad \text{[Formula 1]}$$

$$\hat{\eta}_i = \eta_i + E_{type} + E_{temp} \qquad \text{[Formula 2]}$$

$$A_i = \sigma_{TAB}\left(Concat\{f_i^1, f_i^2, \dots, f_i^{Tcurr}, \hat{\eta}_i\}\right) \qquad \text{[Formula 3]}$$

$\sigma_P$ And $\sigma_{TAB}$ represent a simple MLP and a temporal attention block respectively. Referring to Formula 3, $\sigma_{TAB}$ as input has a form of [1, $T_{curr}$+1, D], and simplex attention may be used. An agent feature $A_i \in [1, D]$ is expressed only using an agent token, which may be learned in consideration of information of every time interval.

Referring to FIG. 4 and FIG. 5 again, the processor 120 may generate an occupancy flow map feature of an agent including local information associated with a predicted trajectory in the feature map of a transformed view 132 that not only reflects the predicted trajectory estimated from the agent feature 136 but also fuses the agent feature 136 (S115)

Figure 8:
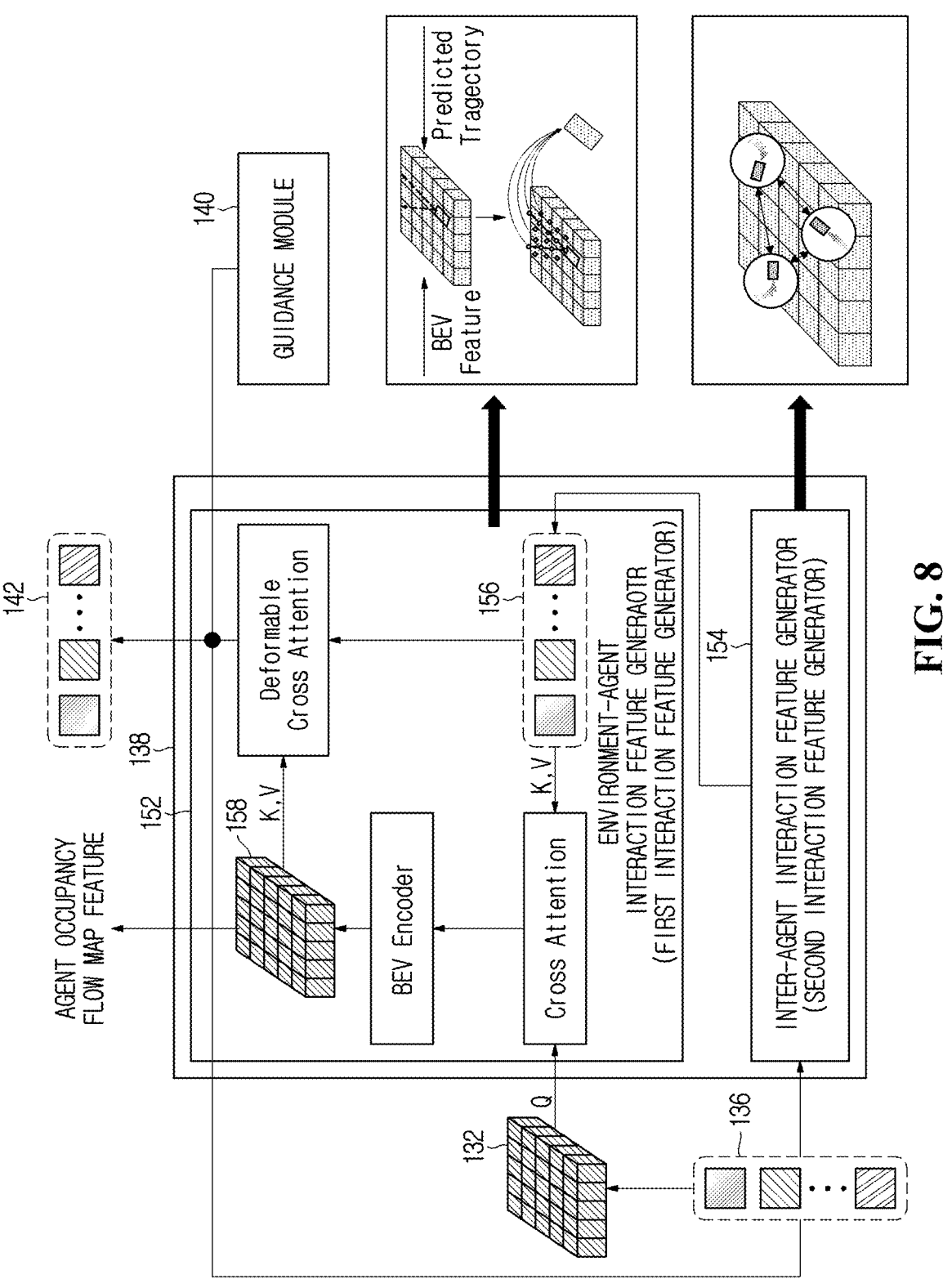
FIG. 8 shows an example of a processing process of an interaction module.

The occupancy flow map feature of the agent is generated by the interaction module 138, and the generation of the occupancy flow map feature will be described in detail through FIG. 8. FIG. 8 shows an example of a processing process of an interaction module.

Referring to FIG. 8, the interaction module 138 may include an environment-agent interaction feature generator 152. As another example, the interaction module 138 may further include an inter-agent interaction feature generator 154 apart from the environment-agent interaction feature generator 152. In the present disclosure, for convenience of description, the environment-agent interaction feature generator 152 may be referred to as a first interaction feature generator, and the inter-agent interaction feature generator 154 may be referred to as a second interaction feature generator.

In order to represent a predicted trajectory of an agent in the feature map of the transformed view 132, the first interaction feature generator 152 may fuse the agent feature 136 with the feature map of the transformed view 132 by cross attention that uses the feature map of the transformed view 132 of a transformed view with the predicted trajectory and the agent feature 136. A predicted trajectory of an agent is produced based on the agent feature 136, and a predicted trajectory may be generated according to each agent. The predicted trajectory may be reflected in the feature map of the transformed view 132 of a transformed view. The cross attention is a type of transformer model, which may have different sources of data used as query (hereinafter, referred to as Q) and data used as key (hereinafter, referred to as K) and value (hereinafter, referred to as V) and determine data of the feature map of the transformed view 132 and the agent feature 136 that are paid attention to output an occupancy flow map and a predicted path of an agent to be described below. The cross attention may contribute to outputting an accurate occupancy flow map and a predicted path based on determined data. As an example, data of the feature map of the transformed view 132 including a predicted trajectory may be used as Q, and data of the agent feature 136 may be used as K and V. As another example, a feature of an agent, which is used as K and V, may be an interactive agent feature 156 that reflects interaction between agents. The interactive agent feature 156 may be generated by the second interaction feature generator 154 and be provided in an eco-centric spatial system.

The first interaction feature generator 152 may generate, by a transformed view encoder, the occupancy flow map feature 158 of an agent based on the feature map of the transformed view 132 with which the agent feature 136 is fused. Specifically, the transformed view encoder may extract a local area based on a predicted trajectory from the feature map of the transformed view 132 and generate local information associated with the local area. The transformed view encoder may provide an occupancy flow map feature including a feature map fused with an agent feature and local information. The local area may include a static object and a dynamic object around the predicted trajectory, and the local information may be feature information associated with the objects.

Figure 9:
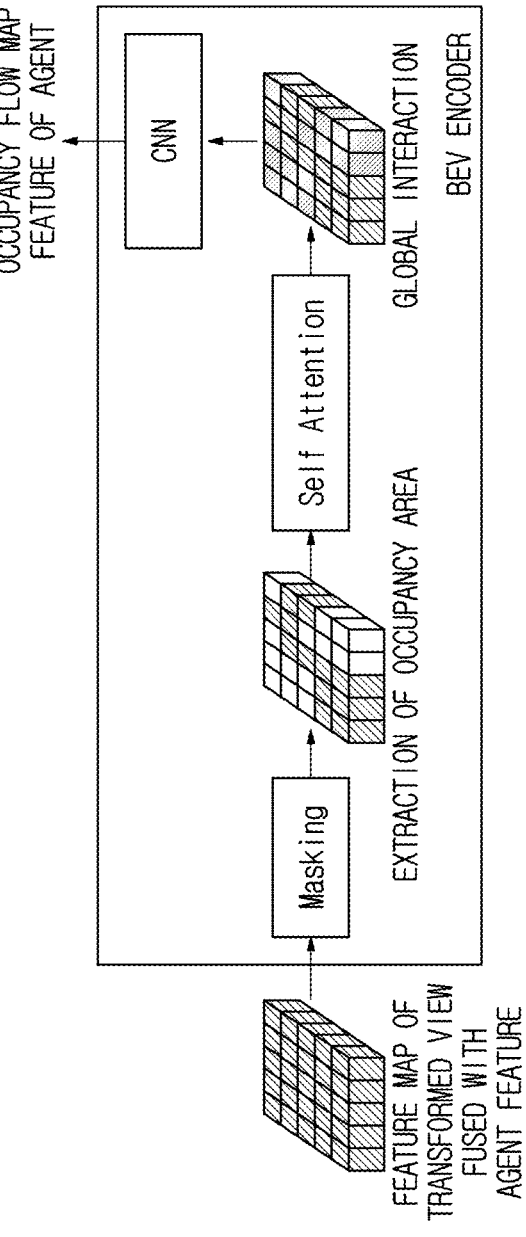
FIG. 9 shows an example of a processing process of a transformed view encoder.

A processing process of a transformed view encoder, which generates the occupancy flow map feature 158, will be described through FIG. 9. FIG. 9 shows an example of a processing process of a transformed view encoder.

Referring to FIG. 9, the transformed view encoder may include functions that implements masking, self attention, and a CNN. The transformed view encoder may extract an occupancy area occupied by a predicted trajectory by masking for the feature map of the transformed view 132 that is fused with the agent feature 136.

Next, by self attention based on the feature map of the transformed view 132, the transformed view encoder may predict a trajectory of an agent by identifying global interaction between occupancy areas. Then, the transformed view encoder may generate local information including a feature of a local area associated with the predicted trajectory by applying a CNN to the feature map of the transformed view 132 where self attention is processed. Like cross attention, self attention belongs to a transformer model but may have a same source of data used as Q, K and V.

Next, the transformed view encoder may provide the occupancy flow map feature 158 that is generated to have both the feature map of the transformed view 132 and the local information.

Referring to FIG. 4, FIG. 5 and FIG. 8 again, the processor 120 may generate a fused agent feature 142 by fusing the occupancy flow map feature 158 with the agent feature and generate an occupancy flow map 150 of an agent based on the occupancy flow map feature 158 (S120).

The fused agent feature 142 may be produced by the first interaction feature generator 152. For example, the fused agent feature 142 may be generated by deformable cross attention that uses the occupancy flow map feature 158 and the agent feature 156. In this case, data of the agent feature 156 reflecting interaction between agents may be used for Q, and data of the occupancy flow map feature 158 may be used for K and V.

In order to reduce the limitation of an attention module of a transformer, which is caused by processing of an image feature map, the deformable cross attention may be a processing method that enables the attention module to focus only on a main small sampling point set around a reference point. Thus, as compared with the existing attention module, the above method may accurately analyze a small object with a smaller training time and a smaller training epoch. In the present disclosure, based on a main sampling set around a predicted trajectory shown in the occupancy flow map feature 158, the occupancy flow map feature 158 may be fused with the agent feature 136. The fused agent feature 142 is provided in a different spatial system or coordinate system from the agent feature 136 and may be generated, for example, in an agent-centered spatial system.

For example, the occupancy flow map 150 of the agent may be generated by an agent flow map head 148 that is composed of MLPs. The occupancy flow map 150 may be used instead of a HD map for autonomous driving in an area that lacks a HD map or for which no HD map is present. The occupancy flow map 150 may provide a lane-level degree of accuracy, which is as precise as HD maps, a predicted trajectory and a situation of each agent, and various objects.

A processing process of the interaction module 138 will be described in detail by distinguishing the first interaction feature generator 152 and the second interaction feature generator 154. First, regarding the second interaction feature generator 154 that considers interaction between agents, position embedding values $P_i^{T_{curr}}$ at current time $T_{curr}$ may be integrated for each agent feature that is represented as $A_i$ in an ego-centric coordinate system. Next, interaction between agents may be captured using self attention-based interaction according to each agent.

$$\dot{A}_i = A_i + \sigma_{pos}\left(P_i^{T_{curr}}\right) \qquad \text{[Formula 4]}$$

$$Q_i = \psi_Q \cdot \dot{A}_i, \ K_j = \psi_K \cdot \dot{A}_j, \ V_j = \psi_V \cdot \dot{A}_j \qquad \text{[Formula 5]}$$

In Formulas 4 and 5, $\psi Q$, $\psi K$, and $\psi V$ are learnable matrices, and $\sigma_{pos}$ may represent an MLP for position embedding.

Regarding the first interaction feature generator 152, it may be important to identify an area, which each agent should pay attention to, and to extract information from an environmental feature of a bird's eye view (BEV). Accordingly, a trajectory of an agent May be first predicted, a relevant BEV area may be extracted based on the predicted trajectory, and location information of the extracted BEV area may be delivered to a feature of the agent. To this end, deformable attention may be used. If a predicted trajectory $\overline{Y}_i$ is used as a reference point, important information may be extracted near a pre-indicated trajectory. An offset $\overline{Y}_i$ may be trained to extract information from an area around each reference point associated with an agent. Here, i may denote the number of agents, and o may denote the number of offsets. In addition, a feature of an agent, which is received as input, may be denoted by $\Delta Y_{io}$.

$$\hat{A}_i = \overline{A}_i + \sum_{h=1}^{H} W_h \left[\sum_{o=1}^{O}\left(\alpha_{hio}\overline{W}_h B^\epsilon_{\left(\overline{Y}_i + \triangle \overline{Y}_{hio}\right)}\right)\right] \qquad \text{[Formula 6]}$$

In Formula 6, an offset point O for every predicted future position $\Delta Y_{io}$ may be extracted from each head H. In Formula 6, $\Delta Y_{io}$ and $W_h$ denote linear layers, and $\alpha_{hio}$ denotes an attention weight for each offset of each head.

Referring to FIG. 4 and FIG. 5 again, the processor 120 may identify a behavioral context of an agent to be focused in the fused agent feature 142 with reference to descriptive information of the agent that is generated based on vision information derived at least from an image (S125).

The descriptive information is provided in the guidance module 140, and the identification of the behavioral context may be performed by analyzing the fused agent feature 142 using the descriptive information in the interaction module 138 that generates the fused agent feature 142.

The vision information may be information that is extracted or derived from an image and is provided to identify a situation of each agent. For example, the vision information may be include at least one of a trajectory of an agent, the feature map of the transformed view 132 of a transformed view, and an image of a camera. The descriptive information may represent a behavioral context including a predicted trajectory and a situation suitable for the agent feature 136 as a text. The behavioral context may include an action of an agent up to now and a future intention of the agent. For example, a behavioral context described by a text may include a past trajectory and a predicted trajectory of each agent and a situation (or relationship) between each agent and a neighbor static object.

19
20

Figure 10:
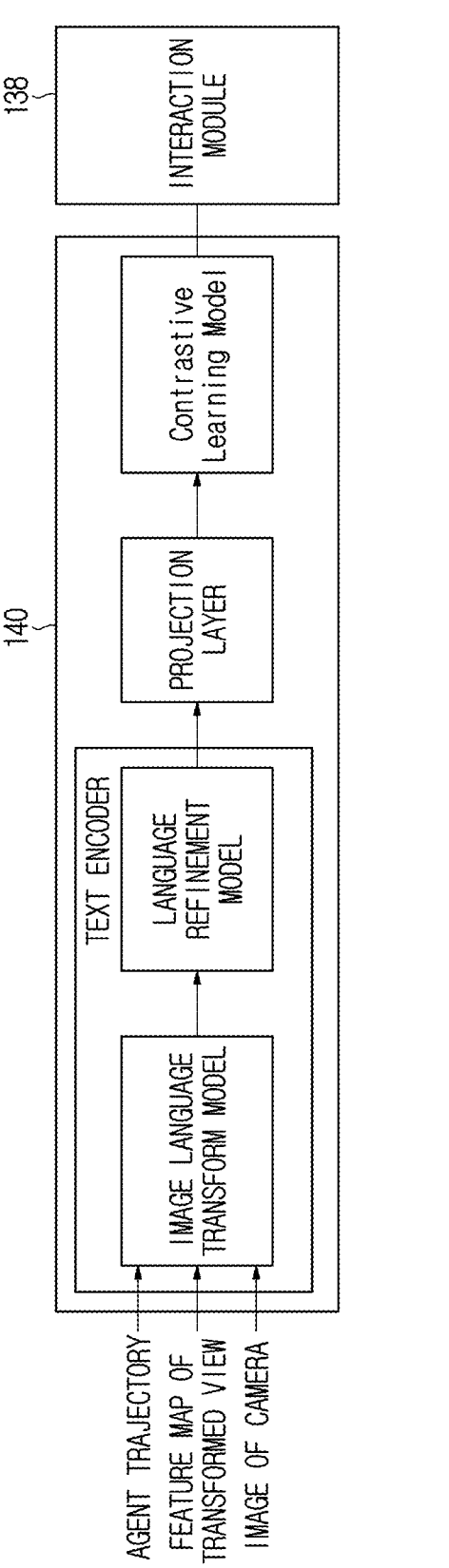
FIG. 10 shows an example of a processing process of a guidance module.

A processing process of the guidance module 140, which generates descriptive information, will be described through FIG. 10. FIG. 10 shows an example of a processing process of a guidance module. The process of FIG. 10 may be performed at any step before a predicted path 146 of an agent is output.

Referring to FIG. 10, the guidance module 140 may generate, by a text encoder, text data, which describes a predicted trajectory of an agent and a situation of the agent in text, based on vision information that expresses a situation in an image.

As for further detailed description of generation of text data, the guidance module may generate text data based on vision information by an image language transform model. For example, a vision-language module (VLM) is used as the image language transform model, and the VLM may be a model that is trained to extract text-type semantic information from an image that is take in a driving environment. Through the model, detailed features of a situation such as 'a man walking on a crosswalk' and 'a vehicle stopped at a red light' may be extracted from an image.

Figure 11A:
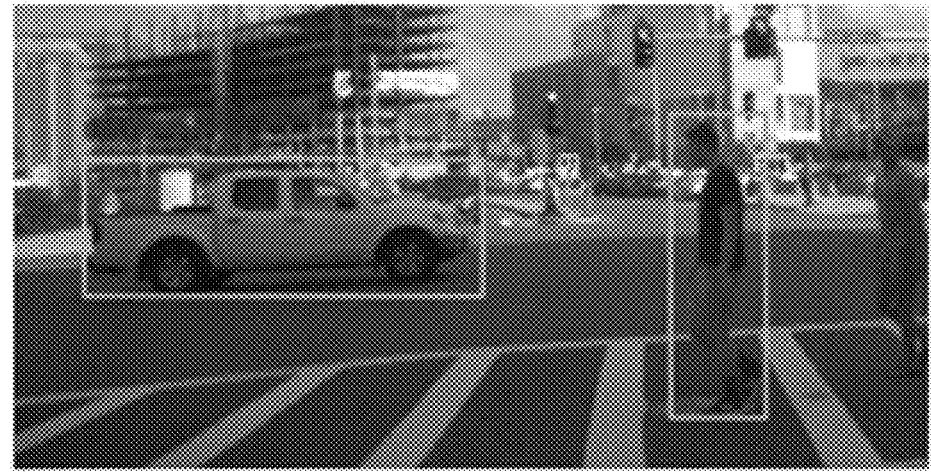
FIG. 11A and FIG. 11B show examples of descriptive data about a behavior and a situation of each agent generated from a guidance module.
Figure 11B:
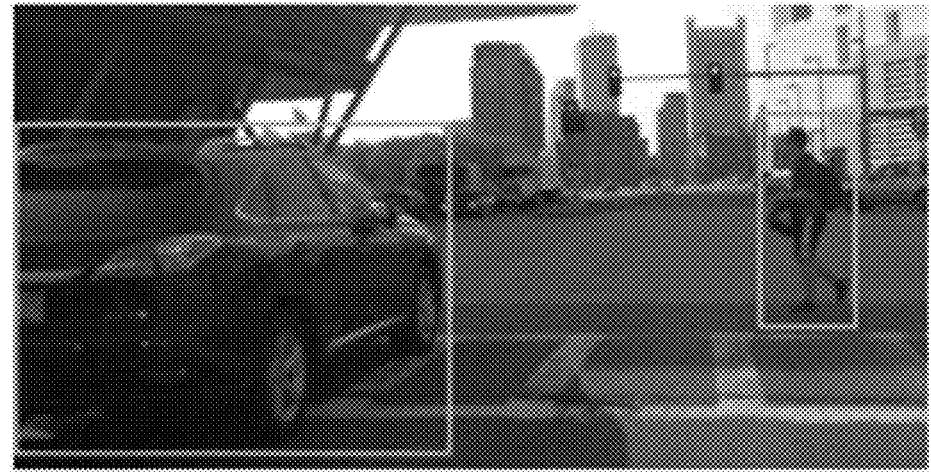

The guidance module 140 may refine text data based on vision information by a language refinement module. For example, refinement of text data may filter irrelevant data and augment a generated caption that is generated by using a large language model (LLM). A refining process may integrate further detailed information by using a type of each agent, a generated caption, and maneuver information extracted based on a rule-based algorithm, thereby ensuring a comprehensive and detailed description. Apart from improving accuracy by augmenting text data generated through a VLM, further data may be integrated to enrich contents, and a LLM and GPT may be employed to this end. For example, when GPT considers ego-centric scenes generated through a VLM such as 'the left side of road' and 'from left to right', text not expected to be present may be removed. Text data generated by a refining process is exemplified in FIG. 11A and FIG. 11B. FIG. 11A and FIG. 11B show an example of descriptive data about a behavior and a situation of each agent generated from a guidance module. As shown in FIG. 11A, the text data associated with the pickup truck does not simply describe the pickup truck driving in front but describe a context associated with the pickup truck that the pickup truck is crossing the intersection and then will continue straight on a predicted trajectory. In FIG. 11B, because the text data associated with a pedestrian also describes that the pedestrian in the middle of the crosswalk is expected to continue straight, the pedestrian's situation and predicted trajectory are indicated in relation to a static object. In FIG. 11B, a detailed context and a predicted trajectory are described for a pedestrian, that is, an agent that is recognized as a very small object in vision information.

Then, the guidance module 140 may encode refined text data by using a text encoder and project the encoded text data and the agent feature 136 into a common embedding space. The guidance module 140 may generate descriptive information, which represents a behavioral context including a predicted trajectory and a situation of an agent matching the agent feature 136 in text, by using a contrastive learning model based on the encoded text data and the agent feature 136.

Meanwhile, models and layers, which are used in the guidance module 140 to generate descriptive information of an agent, may be learnt in the server 200.

Each text may have various formats and contents of text that each agent should adjust to improve trajectory prediction performance and to identify a situation of an agent. In case there are many similar scenarios, a plurality of false negative pairs may occur, which may become complicated because of the lack of a label for defining positive and negative pairs, and a task of defining a negative pair requires a high degree of reliability. Accordingly, the process focuses on extracting relevant information to understand an agent in whole text, and a negative pair may be refined using the information.

To this end, a model may process input text through, for example, BERT and extract a text embedding vector. Then, similar to Formula 3, an attention layer may be used to emphasize a feature in the text embedding vector. This process may collect important information in "text token". Then, a cosine similarity, in which a learnt text token T and a value smaller than a threshold $\Theta$ alone are used as a negative pair, may be calculated in Formula 7.

$$\mathcal{L}_{ij} = \begin{cases} 0, & sim_C (\mathcal{T}_i, \mathcal{T}_j) \geq \Theta \\ 1, & sim_C (\mathcal{T}_i, \mathcal{T}_j) < \Theta \end{cases} \qquad \text{[Formula 7]}$$

A context feature $c_i$ of i-th agent and corresponding text $T_i$ describing a situation of the agent are used as a positive pair, and highest K texts with high cosine similarity between the agent and text are selected and used as a negative pair for contrastive learning. As refinement of a negative pair is performed in advance, only texts with lower similarity than a defined threshold may remain. As shown in Formula 8, a loss function of models associated with the guidance module 140 is a loss according to a similarity between text data describing a situation of an agent and a situation feature of the agent and may be based on, for example, infoNCE loss. A reverse arranging process is denoted by "rev".

$$\mathcal{L}_{con} = -\log \frac{e^{sim_C(c_1, T_i)/\tau}}{\sum_1^K \left( \left[ \left\{ \mathcal{L}_{ij} \times e^{sim_C(c_1, T_j)/\tau} \right\}_{j \in N} \right]_{rev} \right)} \qquad \text{[Formula 8]}$$

For reference, the learning model of FIG. 5 consisting of a plurality of modules May be trained by the loss function of Formula 9.

$$\mathcal{L} = \mathcal{L}_{traj}^{fin} + \mathcal{L}_{traj}^{inter} + \mathcal{L}_{con} \qquad \text{[Formula 9]}$$

$\mathcal{L}_{con}$ is a loss shown in Formula 8, and $$\mathcal{L}_{traj}^{fin} \text{ and } \mathcal{L}_{traj}^{inter}$$

are a loss according to a predicted path of an agent and a loss according to a trajectory of the agent in the feature map of the transformed view 132 fused with the agent feature 136, respectively. A predictor of a Gaussian mixture model (GMM) for trajectory prediction may minimize $L_{traj}$ defined by Formula 10 and thus minimize both a predicted trajectory and a relevant degree of reliability. A loss may be calculated by minimizing a negative logarithmic likelihood function between an actual pose obtained from a GMM prediction parameter and a predicted pose and considering a degree of reliability for each pose in an agent, a time step and a scenario mode M. In Formula 10, b is a scale parameter.

$$\mathcal{L}_{traj} = -\frac{1}{N}\sum_{i=1}^{N}\log\left(\sum_{m=1}^{M}\frac{S_{i,m}}{\sqrt{2b^2}}\exp\left(-\frac{(Y_i - \hat{Y}_{i,m})^2}{2}\right)\right)$$ [Formula 10]

Referring to FIG. 4 and FIG. 5 again, the processor 120 may output the predicted path 146 of an agent from the fused agent feature 142 by using a behavioral context (S130).

The processor 120 may use a trajectory decoder 144, and the trajectory decoder 144 may generate the predicted path 146 of an agent from the fused agent feature 142 by referring to the behavioral context. Specifically, the behavioral context may enable a suitable predicted trajectory and a situation to be determined among various predicted trajectories and situations an agent according to scenarios in the fused agent feature 142. In addition, as the behavioral context augments a predicted trajectory and a situation of an agent that is a small object and thus is not significant in the fused agent feature 142, the predicted path 146 of the agent May be generated.

The trajectory decoder 144 may be configured as an interaction module of a scenario mode, and each agent may have interaction all across M scenarios to promote cooperation between future scenarios and to enhance the reliability of a result. In addition, a GMM predictor may be included which learns a GMM distribution at every time step. The predictor may generate a predicted trajectory of each agent at future time steps in a plurality of scenario modes and a reliability index corresponding to the trajectory, and thus a predicted trajectory of an agent with a high reliability index (e.g., a reliability index satisfying a reliability threshold) may be determined as the predicted path 146.

Referring to FIG. 4 again, the processor 120 may determine an operation of the mobility device 100 based on the predicted path 146 of the agent and control an actuator according to the determined operation (S135).

The present disclosure is technically directed to providing a method and device for predicting a behavior of an agent, which predict the behavior of the agent based on image data of the agent obtained from a surrounding environment and text-based semantic information describing the agent without dependence on a HD map, regarding autonomous driving of a mobility device, thereby ensuring high prediction accuracy, speed of prediction, and reduced use of computing resource all together.

The technical problems solved by the present disclosure are not limited to the above described technical problems. Other technical problems that are not described herein should be more clearly understood by a person having ordinary skill in the technical field, to which the present disclosure belongs, from the following description.

According to the present disclosure, a method is provided for predicting a behavior of an agent for autonomous driving. The method may comprising: generating a feature map of a transformed view with a transformed viewpoint and an agent feature based on an image obtained from a sensor of a mobility device; generating an occupancy flow map feature of an agent including local information associated with a predicted trajectory in the feature map of the transformed view that not only reflects the predicted trajectory estimated from the agent feature but also fuses the agent feature; and outputting a predicted path of the agent from a fused agent feature that fuses the occupancy flow map feature with the agent feature, based on a behavioral context of the agent attended to by descriptive information of the agent derived in relation to the image.

According to an example of the method of the present disclosure, the generating of the occupancy flow map feature may comprise: fusing the agent feature with the feature map by cross attention that uses the feature map of the transformed view with the predicted trajectory and the agent feature, in order to represent the predicted trajectory of the agent in the feature map; extracting a local area based on the predicted trajectory from the feature map and generating local information associated with the local area; and providing the occupancy flow map feature including the feature map fused with the agent feature and the local information.

According to an example of the method of the present disclosure, the generating of the local information may comprise: extracting occupancy areas occupied by the predicted trajectory from the feature map; predicting a trajectory of the agent by identifying global interaction between the occupancy areas through self attention based on the feature map; and generating the local information including a feature of the local area associated with the predicted trajectory by applying a convolution neural network (CNN) to the feature map for which the self attention is processed.

According to an example of the method of the present disclosure, the fused agent feature is generated by deformable cross attention that uses the occupancy flow map feature and the agent feature.

According to an example of the method of the present disclosure, the agent feature fused with the feature map of the transformed view is an agent feature that is processed to reflect interaction of the agent.

According to an example of the method of the present disclosure, the method May further comprising: before the outputting of the predicted path of the agent, generating text data that describes the predicted trajectory of the agent and a situation of the agent in text, based on vision information representing a situation in the image, by using an image language transform model; encoding the text data; and generating descriptive information of the agent that represents the behavioral context including the predicted trajectory and the situation and matching the agent feature in text, by using a contrastive learning model that uses the encoded text data and the agent feature as processed in a common embedding space.

According to an example of the method of the present disclosure, the generating of the text data may comprise: generating, by the image language transform model, the text data based on the vision information; and refining, by a language refinement model, the text data based on the vision information.

According to an example of the method of the present disclosure, a learning model for implementing the method for predicting the behavior is trained by using a loss function that includes a loss according to a similarity between the text data describing the situation of the agent and a situation feature of the agent, a loss according to a trajectory of the agent in the feature map of the transformed view fused with the agent feature, and a loss according to the predicted trajectory of the agent.

According to an example of the method of the present disclosure, the transformed view is a bird's eye view, and wherein the agent feature is generated based on agent information that has multi-modal data obtained from the image, the multi-modal data is heterogeneous data, and the agent feature is generated by a transformer model based on concatenated data that is combined by learning the multi-modal data.

According to an example of the method of the present disclosure, the multi-modal data includes a time-series trajectory of the agent, a type of the agent, and temporal change data of the agent that includes a distance and a heading displacement from a perspective of the mobility device.

According to another example of the present disclosure, a mobility device is provided for predicting a behavior of an agent for autonomous driving. The mobility device may comprising: a sensor configured to detecting a surrounding environment of the mobility device; a memory configured to store at least one instruction; and a processor configured to execute the at least one instruction stored in the memory, wherein the processor is may further configured to: generate a feature map of a transformed view with a transformed viewpoint and an agent feature based on an image obtained from the sensor, generate an occupancy flow map feature of an agent including local information associated with a predicted trajectory in the feature map of the transformed view that not only reflects the predicted trajectory estimated from the agent feature but also fuses the agent feature, and output a predicted path of the agent from a fused agent feature that fuses the occupancy flow map feature with the agent feature, based on a behavioral context of the agent attended to by descriptive information of the agent derived in relation to the image.

The features of the present disclosure, which are briefly summarized above, are only examples of examples or features of the present disclosure and detailed description of the disclosure follows and are not intended to limit the scope of the present disclosure.

The technical problems solved by the present disclosure are not limited to the above mentioned technical problems. Other technical problems solved by the present disclosure, which are not described herein should be more clearly understood by a person having ordinary skill in the art or technical field to which the present disclosure belongs from the following description.

According to the present disclosure, it is possible to provide a method and device for predicting a behavior of an agent, which predict the behavior of the agent based on image data of the agent obtained from a surrounding environment and text-based semantic information describing the agent without dependence on a HD map, regarding autonomous driving of a mobility device, thereby ensuring high prediction accuracy, speed of prediction, and reduced use of computing resource all together.

The effects obtainable from the present disclosure are not limited to the above-mentioned effects. Other effects not mentioned herein should be more clearly understood by those of ordinary skill in the art through the following description.

According to the present disclosure, it is possible to provide a method and device for predicting a behavior of an agent, which predict the behavior of the agent based on image data of the agent obtained from a surrounding environment and text-based semantic information describing the agent without dependence on a HD map, regarding autonomous driving of a mobility device, thereby ensuring high prediction accuracy, speed of prediction, and reduced use of computing resource all together.

According to the present disclosure, because agent features may be grouped and classified, the movement prediction of an agent may be improved based on analysis of features thus classified. As descriptive information of an agent associated with a predicted path is provided in text, explainable AI (XAI) may be implemented. In addition, as an occupancy flow map is generated and auto labeling is easily applied to an agent, multi-tasking with another task is possible.

While the methods of the present disclosure described above are represented as a series of operations for clarity of description, it is not intended to limit the order in which the steps are performed. The steps described above may be performed simultaneously or in different order as necessary. In order to implement the method according to the present disclosure, the described steps may further include different or other steps, may include remaining steps except for some of the steps, or may include other additional steps except for some of the steps.

The various examples of the present disclosure do not disclose a list of all possible combinations and are intended to describe representative examples of the present disclosure. Examples or features described in the various examples may be applied independently or in combination of two or more.

In addition, various examples of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

What is claimed is:

1. A method performed by a processor for controlling autonomous driving of a vehicle, the method comprising:

generating, based on an image obtained from a sensor of a mobility device, a feature map and a feature of an object, wherein the feature map is associated with a transformed view and a transformed viewpoint;

generating an occupancy flow map feature of the object, wherein the occupancy flow map feature comprises local information associated with a predicted trajectory of the object in the feature map that reflects the predicted trajectory, wherein the feature of the object is fused with the feature map, and wherein the predicted trajectory is estimated from the feature of the object fused with the feature map;

outputting a predicted path of the object from a feature of the object fused with the occupancy flow map feature, based on information, associated with a behavioral context of the object, derived from the image, wherein the predicted trajectory is determined, based on a reliability of the predicted trajectory, as the predicted path; and controlling, based on the predicted path, autonomous driving of the vehicle.

2. The method of claim 1, wherein the generating the occupancy flow map feature comprises:

fusing the feature of the object with the feature map by cross attention to represent the predicted trajectory of the object in the feature map, wherein the cross attention uses the feature map with the predicted trajectory and the feature of the object;

extracting, based on the predicted trajectory from the feature map, a local area;

generating local information associated with the local area; and providing the occupancy flow map feature comprising:
the feature map fused with the feature of the object, and
the local information.

3. The method of claim 2, wherein the generating the local information comprises:
extracting occupancy areas occupied by the predicted trajectory from the feature map;
predicting, based on the feature map, a trajectory of the object by identifying global interaction between the occupancy areas through self attention; and
generating the local information by applying a convolution neural network (CNN) to the feature map for which the self attention is processed, wherein the local information comprises a feature of the local area associated with the predicted trajectory.

4. The method of claim 1, wherein the feature of the object fused with the occupancy flow map feature is generated by deformable cross attention that uses the occupancy flow map feature and a feature of the object.

5. The method of claim 1, wherein the feature of the object fused with the feature map of the transformed view is a feature of the object that is processed to reflect interaction of the object.

6. The method of claim 1, further comprising, before the outputting the predicted path of the object;
generating, based on vision information representing a situation in the image, text data by using an image language transform model, wherein the text data describes the predicted trajectory of the object and a situation of the object in text;
encoding the text data; and
generating information of the object that represents the behavioral context, wherein the behavioral context comprises the predicted trajectory and the situation of the object in text that matches the feature of the object, and wherein the situation of the object in text is matched with the feature of the object based on a contrastive learning model that uses the encoded text data and the feature of the object as processed in a common embedding space.

7. The method of claim 6, wherein the generating the text data comprises:
refining, by a language refinement model and based on the vision information, the text data.

8. The method of claim 6, wherein a learning model for implementing the method is trained by using a loss function that comprises:
a loss based on a similarity between the text data, wherein the text data describes the situation of the object in text and a situation feature of the object,
a loss based on a trajectory of the object in the feature map, wherein the feature map is fused with the feature of the object, and
a loss based on the predicted trajectory of the object.

9. The method of claim 1, wherein the transformed view is a bird's eye view, and wherein:
the feature of the object is generated based on object information that has multi-modal data obtained from the image,
the multi-modal data is heterogeneous data, and
the feature of the object is generated by a transformer model and based on concatenated data that is combined by learning the multi-modal data.

10. The method of claim 9, wherein the multi-modal data comprises:
a time-series trajectory of the object,
a type of the object, and temporal change data of the object, wherein the temporal change data comprises a distance and a heading displacement from a perspective of the mobility device.

11. An apparatus for controlling autonomous driving of a vehicle, the apparatus comprising:
a sensor configured to detect a surrounding environment of a mobility device;
a memory configured to store at least one instruction; and
a processor configured to execute the at least one instruction stored in the memory,
wherein the processor is further configured to:
generate, based on an image obtained from the sensor, a feature map and a feature of an object, wherein the feature map is associated with a transformed view and a transformed viewpoint;
generate an occupancy flow map feature of the object, wherein the occupancy flow map feature comprises local information associated with a predicted trajectory of the object in the feature map that reflects the predicted trajectory, wherein the feature of the object is fused with the feature map, and wherein the predicted trajectory is estimated from the feature of the object fused with the feature map; and
output a predicted path of the object from a feature of the object fused with the occupancy flow map feature, based on information, associated with a behavioral context of the object derived from the image, wherein the predicted trajectory is determined, based on a reliability of the predicted trajectory, as the predicted path; and
control, based on the predicted path, autonomous driving of the vehicle.

12. The apparatus of claim 11, wherein the processor is further configured to generate the occupancy flow map feature by:
fusing the feature of the object with the feature map by cross attention represent the predicted trajectory of the object in the feature map, wherein the cross attention uses the feature map with the predicted trajectory and the feature of the object;
extracting, based on the predicted trajectory from the feature map, a local area;
generating local information associated with the local area; and
providing the occupancy flow map feature comprising:
the feature map fused with the feature of the object, and
the local information.

13. The apparatus of claim 12, wherein the processor is further configured to generate the local information by:
extracting occupancy areas occupied by the predicted trajectory from the feature map;
predicting, based on the feature map, a trajectory of the object by identifying global interaction between the occupancy areas through self attention; and
generating the local information by applying a convolution neural network (CNN) to the feature map for which the self attention is processed, wherein the local information comprises a feature of the local area associated with the predicted trajectory.

14. The apparatus of claim 11, wherein the feature of the object fused with the occupancy flow map feature is generated by deformable cross attention that uses the occupancy flow map feature and the feature of the object.

15. The apparatus of claim 11, wherein the feature of the object fused with the feature map of the transformed view is a feature of the object that is processed to reflect interaction of the object.

16. The apparatus of claim 11, wherein the processor is further configured to, before outputting the predicted path of the object:

generate, based on vision information representing a situation in the image, text data by using an image language transform model, wherein the text data describes the predicted trajectory of the object and a situation of the object in text;

encode the text data; and generate information of the object that represents the behavioral context, wherein the behavioral context comprises the predicted trajectory and the situation of the object in text that matches the feature of the object, and wherein the situation of the object in text is matched with the feature of the object based on a contrastive learning model that uses the encoded text data and the feature of the object as processed in a common embedding space.

17. The apparatus of claim 16, wherein the processor is further configured to generate the text data by refining, by a language refinement model and based on the vision information, the text data.

18. The apparatus of claim 16, wherein a learning model is trained by using a loss function that comprises:

a loss based on a similarity between the text data, wherein the text data describes the situation of the object in text and a situation feature of the object, a loss based on a trajectory of the object in the feature map, wherein the feature map is fused with the feature of the object, and a loss based on the predicted trajectory of the object.

19. The apparatus of claim 11, wherein the transformed view is a bird's eye view, and wherein:

the feature of the object is generated based on object information that has multi-modal data obtained from the image, the multi-modal data is heterogeneous data, and the feature of the object is generated by a transformer model and based on concatenated data that is combined by learning the multi-modal data.

20. The apparatus of claim 19, wherein the multi-modal data comprises:

a time-series trajectory of the object, a type of the object, and temporal change data of the object, wherein the temporal change data comprises a distance and a heading displacement from a perspective of the mobility device.

\* \* \* \* \*